United States Patent [19]

Iketaki

[11] 3,959,818
[45] May 25, 1976

[54] SERVO FOR VIDEO TAPE APPARATUS WITH EDITING CAPABILITIES

[75] Inventor: Kazuo Iketaki, Yokohama, Japan

[73] Assignee: Sony Corporation, Tokyo, Japan

[22] Filed: Mar. 26, 1975

[21] Appl. No.: 562,047

Related U.S. Application Data

[63] Continuation of Ser. No. 401,448, Sept. 27, 1973, abandoned.

[30] Foreign Application Priority Data

Sept. 28, 1972 Japan.................. 47-112646[U]

[52] U.S. Cl.................................... 360/70; 360/14
[51] Int. Cl.²................. G11B 19/28; G11B 27/02
[58] Field of Search .................. 360/14, 70, 73, 75

[56] References Cited
UNITED STATES PATENTS

| | | | |
|---|---|---|---|
| 2,979,558 | 4/1961 | Leyton................................. | 360/70 |
| 3,542,950 | 11/1970 | Luther................................. | 360/70 |
| 3,651,276 | 3/1972 | Clark.................................... | 360/70 |
| 3,662,098 | 5/1972 | Yano..................................... | 360/70 |
| 3,686,432 | 8/1972 | Deguchi............................... | 360/70 |

*Primary Examiner*—Bernard Konick
*Assistant Examiner*—Alan Faber
*Attorney, Agent, or Firm*—Lewis H. Eslinger; Alvin Sinderbrand

[57] ABSTRACT

Video tape recording apparatus with means for editing the recorded material without significant sudden change in current to the capstan motor. During recording of the added or replacement material the capstan motor is controlled by comparing the phase of a fixed high frequency signal with a signal generated synchronously with rotation of the capstan motor. The fixed frequency signal can be generated by a stable oscillator or by using submultiples of fixed-frequency components of the video signal.

5 Claims, 7 Drawing Figures

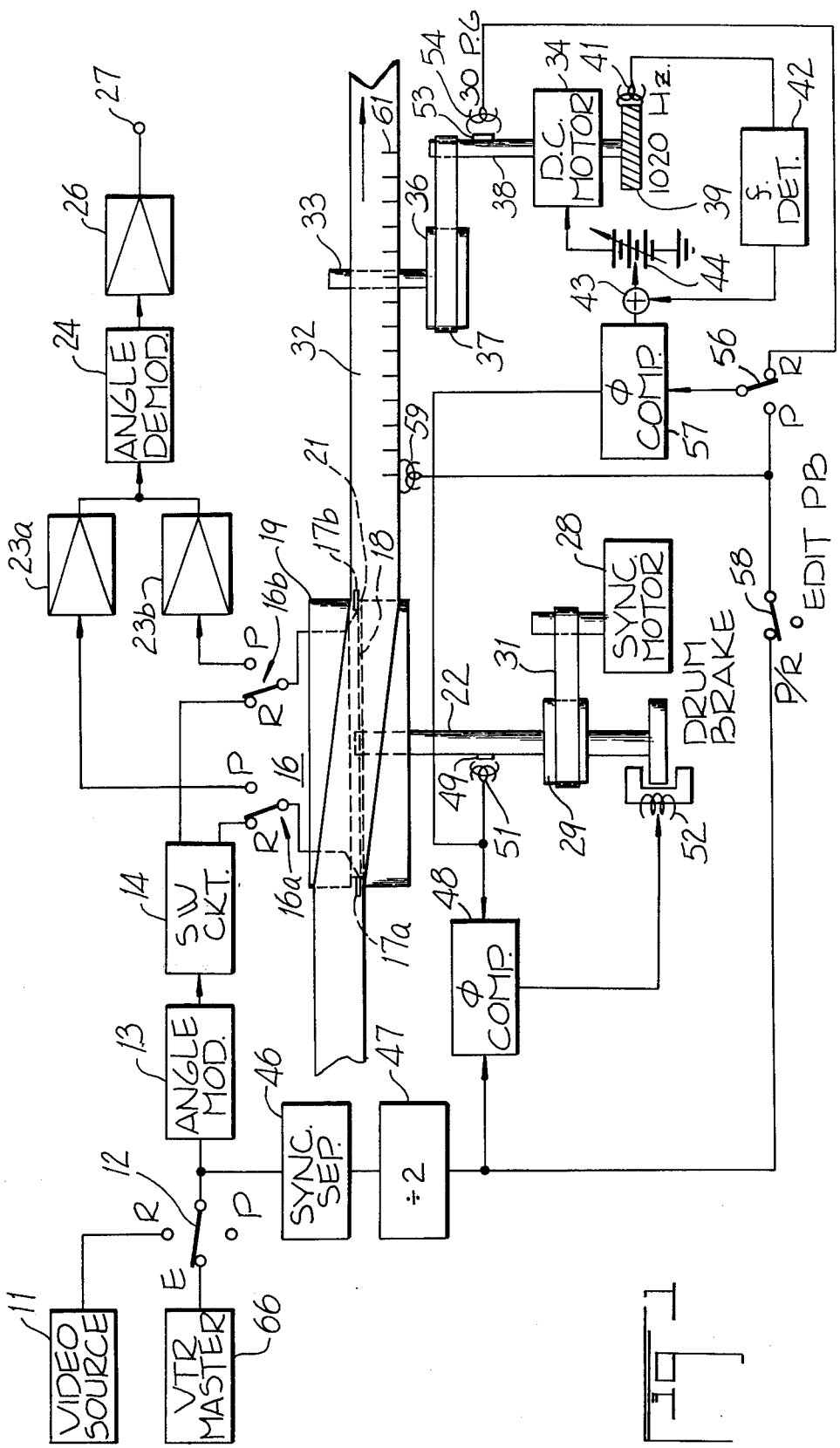

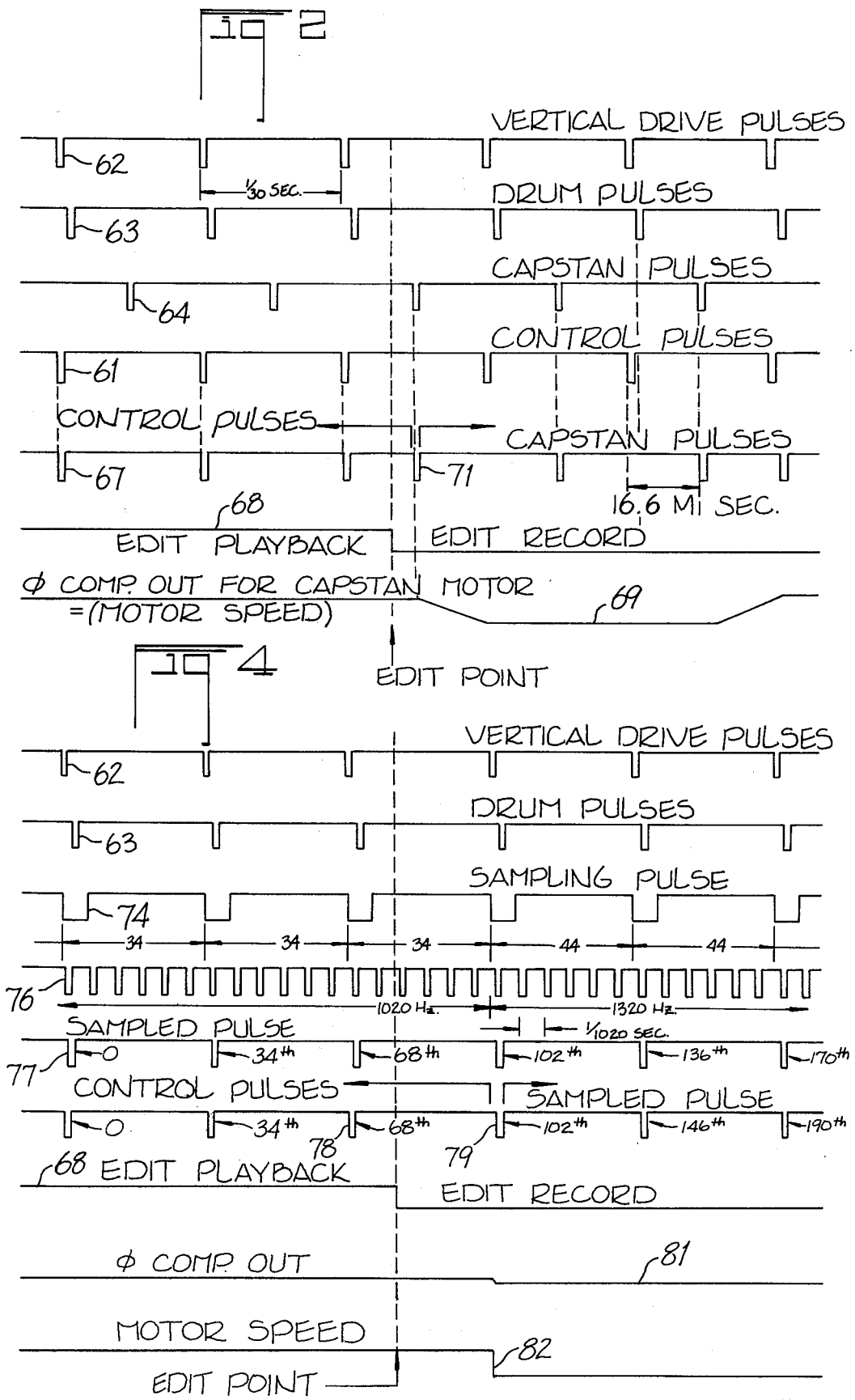

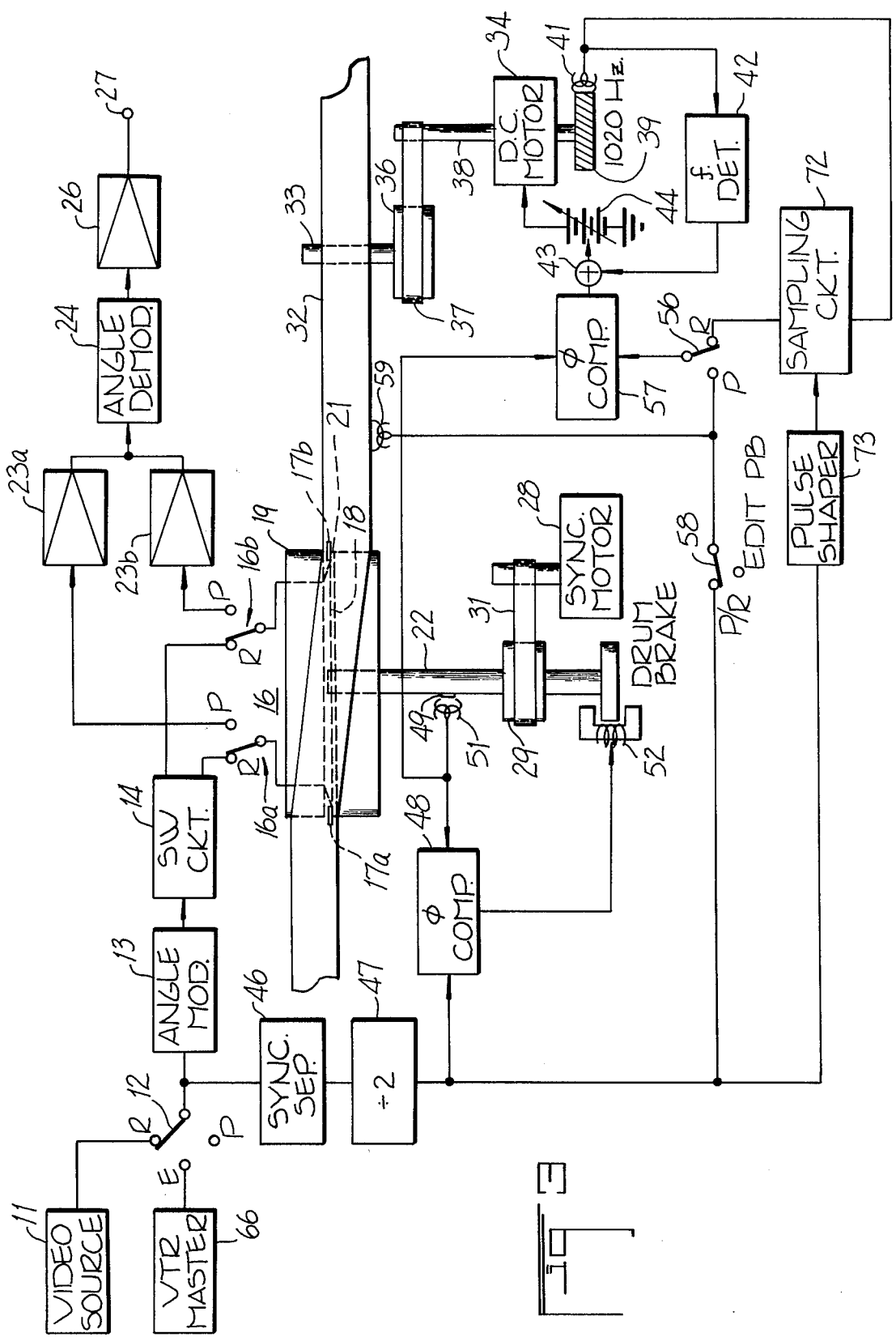

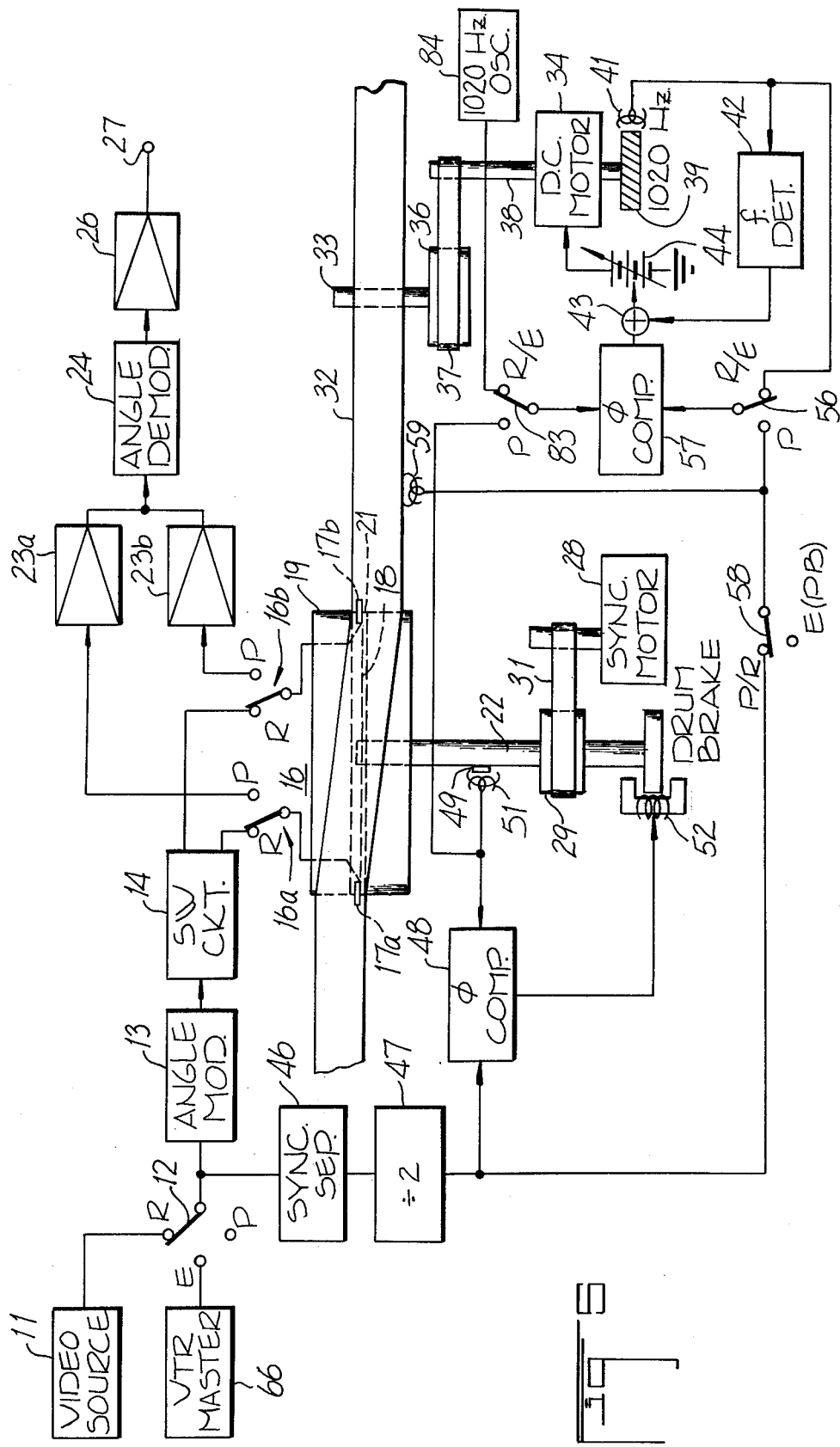

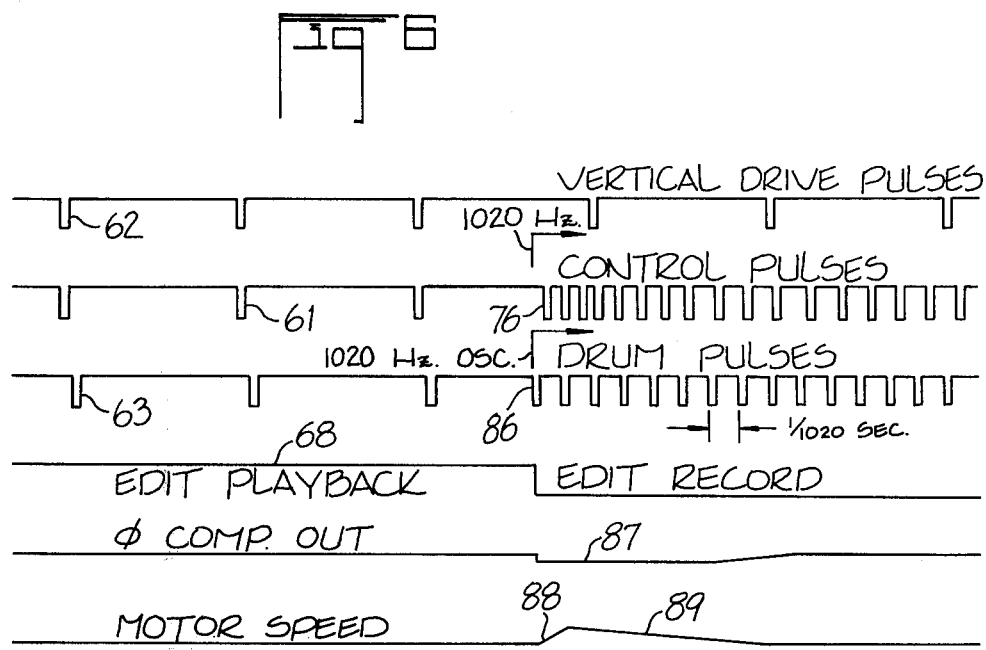

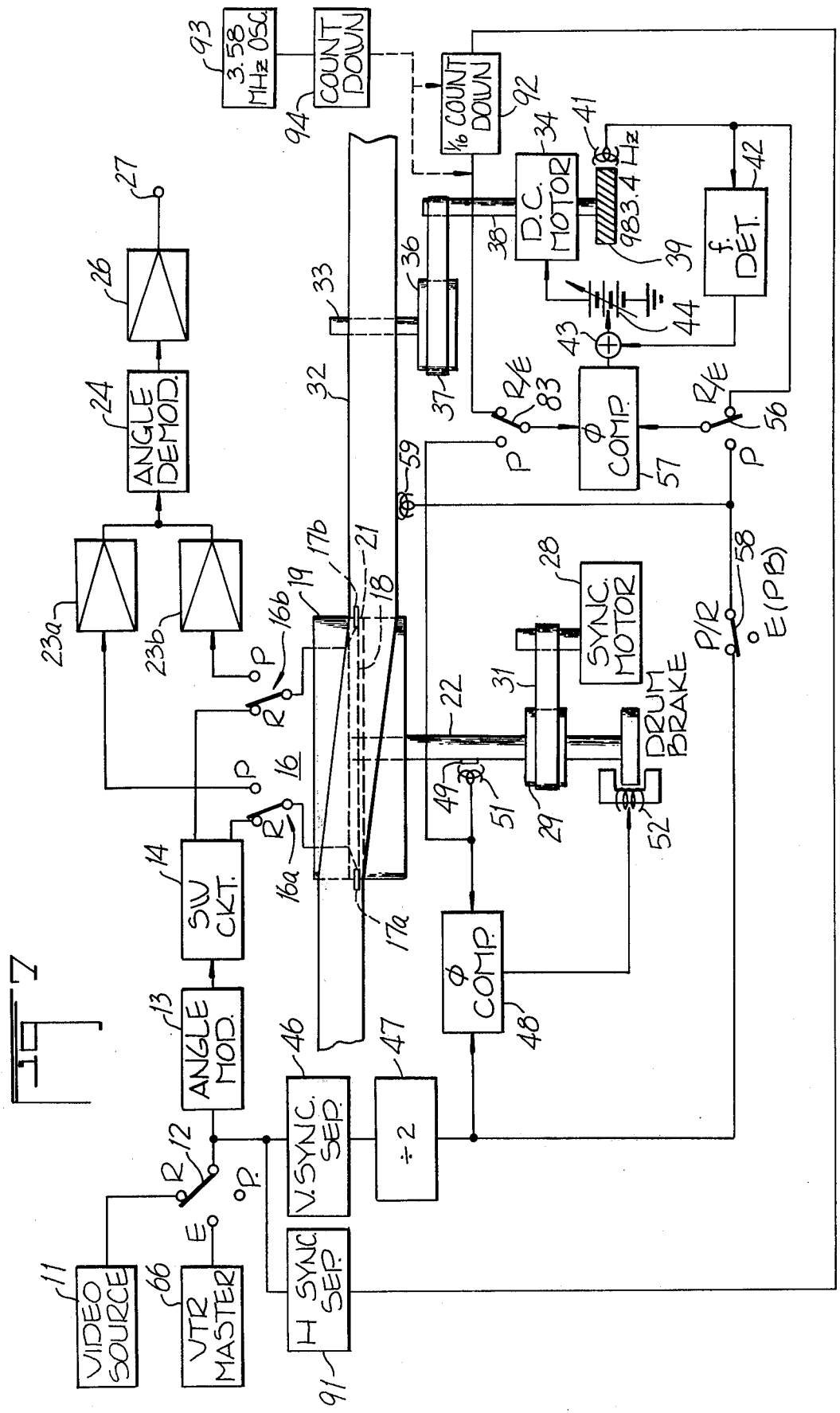

SERVO FOR VIDEO TAPE APPARATUS WITH EDITING CAPABILITIES

This is a continuation of application Ser. No. 401,448, filed Sept. 27, 1973, now abandoned.

BACKGROUND OF THE INVENTION

1. Field of the Invention

This invention relates to capstan and head servo systems for video tape recording and reproducing apparatus and more particularly to such systems having the capability of permitting material to be added or replaced without any significant errors caused by the transition from material previously recorded to the added video signal on the tape.

2. The Prior Art

When information is recorded on magnetic tape, it is frequently desirable to edit the material, for example to replace part of the information by different information, or to add new material. The process of adding new information at a certain point in the recording is called an assemble edit operation. A typical procedure is for the editor to run the tape through a video tape machine that is capable of both recording and playing back video signals. Setting the machine to play back the recorded information, the editor watches a television monitor until the scene reaches a point at which the new material is to be added. The machine is stopped at that point and the tape is rewound part of the way. Then the tape is started again and, when the tape reaches the scene previously noted by the editor, the operation is suddenly switched to cause the new material to be recorded, starting at the designated point. The original operation just described, to the point at which the tape is stopped, is a normal playback operation. The operation after the tape was rewound is referred to as an edit playback operation up to the point that the new material starts being recorded. From there on to the end of the recording of the new material, the operation is referred to as an edit record operation.

A video tape recorder transport mechanism requires means to drive a capstan to pull the tape along its operating path at a predetermined speed. Part of the path is a helical section at least part way around a drum that has a gap that coincides with the perimeter of rotational movement of, usually, two diametrically opposed transducers that can be used for recording or for playback operation. The angular position of the support mechanism for these transducers, or heads, must be precisely and constantly correlated with the movement of the tape and the television signal to be recorded.

Because the tape follows a helical path and the heads follow a circular path, the video information is recorded on the tape in a series of slant tracks that are at an angle to the longitudinal direction of the tape. Typically, each slant track records all of the information on one television field and two adjacent slant tracks record all of the information in one television frame. The correlation between the position of the heads and the television signal is such that, as each head starts to record a new track, the first information recorded is the information during the vertical blanking interval.

A typical video tape transport mechanism includes a motor to drive the heads at the proper speed and a separate capstan motor. In order to correlate the position of the heads with the television signal, the shaft on which the heads are mounted has a magnet that moves past a fixed coil as the shaft rotates. Each time the magnet does so, it produces a pulse in the coil when the heads are in a specific angular position. This pulse is compared with a signal derived from the vertical synchronizing signal of the composite television signal, and the mechanism is adjusted so that when the requirements of the comparison circuit are satisfied, the heads will be in position to begin a new track at the proper time with respect to the television signal.

The capstan motor may be a direct current motor which can run at any speed. A speed control circuit may be provided in the form of a magnet attached to rotate with the capstan motor shaft, but this magnet is provided with a number of poles so that it generates a relatively high frequency signal in a coil located close enough to be intercepted by the magnetic fields of the individual poles. A frequency detector circuit produces a direct voltage, the magnitude of which is a function of the frequency of the pulses induced in the capstan's speed control coil. This direct voltage is used to control the operating current of the motor to cause the motor to operate at the desired speed or very close to it. The speed of the capstan motor is controlled even more precisely by means of a servo circuit utilizing another magnet on the shaft of the capstan to generate a signal in another coil. The latter signal is compared with a vertical synchronizing signal or a signal derived from the head shaft but operated synchronously with the vertical synchronizing signal.

The interconnections between the motors and the servo circuits therefor have taken several forms in tape machines constructed heretofore. Such interconnections differ during various modes of operation, i.e., the recording mode, the playback mode and the edit record mode. During the initial recording, it is necessary that the rotation of the head shaft and therefore, of the capstan, be controlled by the external video signal being recorded. In order to control the subsequent playback operation, a control signal is simultaneously recorded along one edge of the tape by means of a fixed head. This control signal is recorded as a series of pulses, each of which corresponds with one of the pulses derived from the vertical synchronizing signal. During normal playback operation there is no external signal and thus the video tape machine must be controlled by signals recorded upon the tape. The head motor, being a synchronous motor, operates at a specific speed, but its phasing is controlled by the pulses recorded along the edge of the tape.

In a video machine arranged for editing, there is an important difference between the normal playback operation and the edit playback operation. In the edit playback operation, even though the machine is reproducing signals recording on the tape passing through it, the phase control of the head is governed by signals derived from the composite video signal that is to be recorded once the proper point is reached. This makes it possible to shift instantaneously from the edit playback mode to the edit record mode at the edit point, and the slant tracks of the newly recorded material will fall into exactly the same positions as the slant tracks of the material being deleted in the section of the tape that follows edit point.

However, in a conventional video tape recording machine, since the reference signal of the capstan phase servo circuit is supplied from different signal sources during the edit playback and the edit record modes, an out-of-phase condition may be induced in the capstan circuit at the assemble point.

Accordingly, it is an object of the present invention to provide an improved system for effecting proper phase lock synchronizism between the rotational phase and speed of the head and the rotational phase of the capstan for normal video recording and reproduction.

It is another object of the invention to provide a system that permits electronic editing of a new video signal in place of an existing recorded video signal, such editing to take place in a controlled manner and without any significant time base error.

SUMMARY OF THE INVENTION

According to the present invention a video tape recorder to be used to edit the material being recorded has a first motor to drive the recording heads and a second motor to drive the capstan that pulls the tape past the drum in which the recording heads are located. The head driving motor is a synchronous motor and the shaft to which the heads are attached has a permanent magnet that generates pulses in a coil that intercepts the field of the magnet as the motor rotates the head shaft. These pulses are applied to the phase comparator circuit with pulses derived from a source of material to be recorded. This may be either original material or material from a master video tape recorder. The output of the comparator controls a brake on the head shaft to keep the rotation of the shaft properly phased with respect to signals to be recorded on the tape.

The capstan motor is operated on dirct current, and it also has a magnet attached to its shaft to generate a magnetic field in a coil arranged to intercept the field. However, the magnet on the capstan motor shaft has a number of poles around its periphery so that it generates a relatively high frequency of approximately 1,020 Hz in a coil that intercepts that magnetic field. This coil may be called a capstan speed control coil. A frequency detector connected to the latter coil generates a direct voltage, the amplitude of which is related to the actual frequency generated in the coil, and this direct voltage is applied to the source of direct current that operates the motor so that the motor will run at a speed to generate in the coil a signal of the proper frequency.

A second phase comparator is also connected to the means to control the direct current that operates the capstan motor, and switching means are provided that can connect the second phase comparator either to a source of fixed oscillations or to the coil in which pulses are generated during rotation of the recording heads. The second comparator has a second input that can be switched during recording and editing capstan speed control coil. The switching means connected to the second comparator also includes contacts to switch the second comparator during playback to compare pulses generated in the coil that is magnetically coupled to the rotor of the recording heads with control pulses recorded on the tape.

The source of fixed frequency oscillations may be either a 1,020 Hz oscillator or a count-down circuit connected to be actuated by external horizontal synchronizing signals or a count-down circuit that counts down the sub-carrier signal in a color television composite signal. In either case these high frequency signals are counted down to an appropriate frequency to control the capstan motor. Particularly in the case of using the color sub-carrier, the counted-down signal may not be 1,020 cycles and if not, the permanent magnet attached to the shaft of the capstan motor must be arranged to generate a signal having a frequency equal to the divided frequency of the oscillator synchronized to the burst signals.

BRIEF DESCRIPTION OF THE DRAWINGS

FIG. 1 is a block diagram of a video tape recorder suitable for editing and constructed according to the prior art.

FIG. 2 is a series of waveform diagrams at various points in the circuit in FIG. 1 during different modes of operation.

FIG. 3 is a block diagram of another prior art video tape recorder with means for editing the material to be recorded.

FIG. 4 is a series of waveforms found at various points in the circuit in FIG. 3 during operation of the circuit.

FIG. 5 is a block diagram of one embodiment of the present invention.

FIG. 6 shows a series of waveforms of signals at various points in the circuit in FIG. 5 during operation thereof.

FIG. 7 is a block diagram of a modified embodiment of the present invention.

DETAILED DESCRIPTION OF THE INVENTION

The prior art system shown in FIG. 1 includes a video signal source 11 connected to the recording terminal R of a three position switch 12. The arm of the switch is connected to an angle modulator 13, such as a frequency modulator in which the frequency of a carrier is modulated by selected components of the video signal. The frequency modulated signal from the modulator 13 is applied to a switching circuit 14, the output of which is connected to recording terminals R of two sections 16a and 16b of a second switch. The arm of the section 16a is connected to a recording/playback transducer or, head, 17a and the arm of the switch section 16b is connected to a similar head 17b mounted at the opposite end of an arm 18 from the head 17a. The arm 18 rotates the heads 17a and 17b coaxially with respect to a drum 19. The heads are located so that they fit in a slot 21 between upper and lower sections of the drum 19 and are rotated by a shaft 22.

The switch sections 16a and 16b have playback terminals P connected, respectively, to a pair of amplifiers 23a and 23b. The output signals of these amplifiers are combined and applied to an angle demodulator 24 that demodulates the frequency modulated signal component during playback. The output of the demodulator 24 is connected to another amplifier 26, and the output of this amplifier is connected to an output terminal 27 from which the reproduced television signal may be derived. The shaft 22 that rotates the arm 18 and the heads 17a and 17b is driven by a synchronous motor 28 connected to a pulley 29 on the shaft 22 by means of a belt 31.

Magnetic tape 32 is wrapped helically approximately half way around the drum 19 and is pulled along by a capstan 33 driven by a direct current motor 34. The capstan has a pulley 36 connected by means of a belt 37 to the shaft 38 of the motor 34. A multi-pole magnet 39 is attached to the opposite end of the shaft 38 from that encircled by the belt 37. The poles of the magnet 39 produce a relatively high frequency signal in a pickup coil 41 located close enough to the shaft 38 to intercept the magnetic fields of the poles in the magnet 39. A typical speed for the shaft 38 is 30 revolutions per second and a typical number of poles on the magnet 39 is 34 so that the frequency generated in the coil 41 is 1,020 Hz. This relatively high frequency signal is applied to a frequency detector 42 that generates a direct voltage signal the magnitude of which depends upon the frequency of pulses generated in the coil 41. The direct voltage signal from the frequency detector 42 is applied by way of an adding circuit 43 to a controlled-current supply 44 that supplies the current to run the motor 34. The magnet 39, the speed control coil 41, the detector 42, the adder 43, and the controlled power supply 44 provide a speed control circuit for the motor 34.

During the recording of a new signal, synchronizing pulses of the composite signal from the source 11 are separated by a synchronizing signal separator circuit 46 that is connected to the arm of the switch 12. The circuit 46 provides at its output a pulse signal having a repetition rate of 60 pulses per second, which is the vertical synchronizing signal frequency of the composite television signal. This 60 pulse per second signal is divided by two in a circuit 47, and the output pulses at the rate of 30 pulses per second are applied to a comparator 48. A magnet 49 mounted on the shaft 22 so as to rotate therewith induces pulses in a coil 51, and this coil is connected to a second input circuit of the comparator 48. The comparator produces an output signal that has a magnitude controlled by the difference in timing between the pulses received from the circuit 47 and those received from the coil 51. This output signal is applied to the coil 52 of a drum brake on the shaft 22 to slow down the shaft enough so that the heads 17a and 17b will be in proper position to record selected parts of the incoming composite television signal at specific points on each slant track recorded on the tape 32.

While the speed control circuit of the motor 34 keeps the motor at approximately the correct speed, the motor is controlled even more precisely by a second servo circuit that includes a magnet 53 on the shaft 38 and an adjacent pickup coil 54 is connected to the recording terminal R of a double-throw switch 56, the arm of which is connected to one input circuit of a second comparator 57. This comparator also has another input circuit connected to the coil 51 to receive pulses therefrom, and the output of the comparator 57 is connected to the adder circuit 43 to provide the final adjustment of the current from the source 44 to the motor 34 so that the motor not only runs at the proper frequency but even at a fixed phase with respect to the shaft 22 that rotates the heads 17a and 17b. It is not necessary for the capstan motor to run at a fixed phase with respect to the shaft 22, but doing so means that it is at precisely the same frequency or an integral multiple thereof. The speed control circuit keeps the speed close enough so that it could not be any multiple higher than one.

The output of the circuit 47, which is a pulse signal having a repetition rate of 30 pulses per second, is connected to one of the fixed terminals of a double-throw switch 58. The arm of the switch 58 is connected to the playback terminal P of the switch 56 and is also connected to a fixed transducer 59 that records the pulse signal from the circuit 47 as a series of control pulses 61 on the edge of the tape 32.

The operation of the circuit in FIG. 1 will be described with respect to the waveform shown in FIG. 2. The first waveform shown in FIG. 2 is referred to as the vertical drive signal and is a series of pulses 62. These pulses are actually spaced one-thirtieth of a second apart and so have a repetition rate that is one-half the repetition rate of the vertical synchronizing signal of the composite television signal from the source 11. These are the pulses applied from the circuit 47 to the comparator 48 and, through the switch 58 to the fixed transducer 59 to be recorded as control pulses 61. The coil 51 generates a series of pulses 63 and applies them to the comparator 48 to produce the necessary control signal to apply to the coil 52 of the brake to correlate the position of the heads 17a and 17b with respect to the tape 32 and the signal from the source 11.

During recording, pulses from the coil 51 are applied to the comparator 57 and are compared with the pulses from the coil 54. The latter are indicated in FIG. 2 as the pulse signal 64. It is not necessary that the pulses 64 be timed to coincide with the pulses 63 or 62, and all that is necessary is that the comparator 57 be set to control the current source 44 so as to keep the timing between the pulses 64 and the pulses 63 at some fixed relationship, such as that shown in FIG. 2.

During normal playback, the arm of the switch 12 is shifted to the PB terminal so that no signal is applied to the modulator 13 or to the synchronizing separator 46. The switch 58 continues to be closed and so the pulses 61 recorded on the tape 32 are played back through the transducer 59 and are applied to the comparator 48 to achieve the same control of the heads 17a and 17b as was true during the recording interval. However, the arm of the switch 56 is shifted from its R terminal to its P terminal so that the comparator 57 is actuated, not by pulses from the coil 54, but by the pulses 61.

During the edit playback operation the arm of the switch 12 is connected to the E terminal which is connected to a master video tape recorder 66 that has the editing material on its tape. There is a lead-in section ahead of the editing material, and at least synchronizing signals are recorded on the lead-in section. The arms of the switch sections 16a and 16b are still in contact with their respective playback terminals P and so the signal from the master VTR 66 is not recorded, but its vertical synchronizing signal is separated by the circuit 46 and counted down by the circuit 47 and applied to control the comparator 48. The switch 58 is open during edit playback so that the control pulses 61 are not applied to the comparator 48, but they are applied to the comparator 57 along with pulses from the coil 51. These control pulses are identified in FIG. 2 as the pulses 67 during the edit playback interval 68. During this interval, the output of the phase comparator 57 has a value indicated by reference numeral 69.

When the edit point is reached at which it is desired to record editing material from the master VTR 66 on the tape 32 in place of material that was previously recorded there, the arms of the switch sections 16a and 16b are switched to their recording terminals R, the arm of the switch 58 is returned to the P/R terminal, and the arm of the switch 56 is returned to its R terminal. When the arm of the switch 56 moves away from the P terminal and into contact with the R terminal, it no longer receives the control pulses 67 but instead receives pulse 71 from the coil 54. These pulses 71 are coincident with the pulses 64, and the first pulse 71 may be spaced from the last pulse 67 preceding the edit point by an uncontrolled interval of time. The maximum duration of this interval is 16.6 mS. As a result, when the first pulse 71 acts upon the comparator circuit, the output of the comparator circuit starts to shift to a different level that would change the speed of the motor 34 to bring the capstan 33 into a different phase relationship with respect to the shaft 22. This would cause a sudden surge in the motor 34 and would have an unpleasant and noticeable effect on the operation of the system in FIG. 1.

The system shown in FIG. 3, which was in existance prior to the present invention, overcomes the sudden surge that is a disadvantage of the system in FIG. 1. Most of the elements of FIG. 3 are similar to those in FIG. 1 and need not be described again. The phase control servo circuit for the capstan motor 34 in FIG. 3 omits the coil 54 and, instead, connects the coil 41 to a sampling circuit 72. A pulse shaper 73 is connected to the frequency divider circuit 47 to be actuated by the relatively narrow pulses from the circuit 47. The pulse shaper 73 widens these pulses to allow them to serve satisfactorily as sampling pulses to sample the relatively high frequency pulse signal applied to the sampling circuit 72 from the coil 41.

The operation of the circuit in FIG. 3 will be described with reference to the waveform shown in FIG. 4. During the initial recording of a television signal on the tape 32, the rotation of the shaft 22 is controlled in the same way as in the system in FIG. 1, by comparison of the timing of pulses 63 from the coil 51 with pulses 62 from the divide-by-two circuit 47. The basic speed control circuit of the capstan motor 38 is also the same as in the system in FIG. 1, but the system in FIG. 3 has no separate coil equivalent to the coil 54 in the system in FIG. 1. Instead, there is a connection from the speed control coil 41 to the sampling circuit 72. The pulse 73 is connected to the output of the circuit 47 that produces the pulses 62 to be applied to the comparator 48. This shaper widens the pulses as indicated by the wave 74, and the comparator 57 operates to adjust the phase of the shaft 37 of the motor 34 so that one of the relatively high frequency pulses generated in the coil 41 will pass through the sampling circuit 72 during the occurrence of each sampling pulse 74.

During the regular playback of the material recorded on the tape 32, the arm of the switch 56 is placed in connection with the playback contact P so that the comparator 57, as in the case in FIG. 1, is controlled by pulses from the coil 51 and from the transducer 59. As in the system shown in FIG. 1, during the playback operation there is no direct connection from any coil that would generate signals having a frequency, or more precisely, a repetition rate, directly dependent on the phase of the shaft 38 of the rotor. However, if the capstan motor 34 starts to speed up, it increases the tension on the tape and changes the relative locations of the recorded control pulses, causing the comparator 57 to reduce the current to the motor 34. The opposite effect takes place if the motor starts to slow down.

During the edit playback operation, the switch 58 is open, and the comparator 48 is controlled by pulses from the circuit 47 derived from the master VTR 66, but the comparator 57 is still controlled by pulses from the coil 51 and the transducer 59.

At the end of the edit playback when the tape 32 has reached the point at which the new material from the master VTR is to be recorded on it, the switch 58 is closed again and the arm of the switch 56 is placed in contact with the recording terminal R. As a result the comparator 57 is controlled by comparison of the pulses 63 produced by the coil 51 and certain of the pulses 76 from the coil 41 that pass through the sampling circuit 72 upon the occurrence of each of the sampling pulses 74. The sampled pulses are indicated by reference numeral 77.

Since the frequency of the pulses 76 is relatively high, and is typically 1.020 Hz, the time difference between two successive pulses is of the order of 0.001 sec. The maximum error in timing between the last control pulse 78 to be applied to the comparator 57 during the edit playback operation 68 before the system was switched to edit record, and the first sampled pulse 79 can therefore be no more than about 0.001 sec., which means that the error voltage 81 produced by the comparator will be very small. However, the fact that there are so many of the pulses 76 from the coil 41 for each pulse 63 from the coil 51 means that if the speed of the motor 34 shifts to a speed having one of the many integrally related values, the coil 41 could produce one of the pulses 76 at the proper time to pass through the sampling gate circuit 72 and satisfy the comparator 57.

For example, if the motor speed shifts, as indicated by the point 82 in the graph of motor speed, so that the motor is suddenly running at a speed that will produce the pulses 76 at a rate of 1,320 Hz instead of the proper 1,020 Hz, the sampling circuit 72 will not sample each 34th pulse but will sample each 44th pulse. The proper sampled pulses are indicated in a pulse wave 77 as being the 34th, 68th, 102nd, 136th, 170th pulses. During the edit playback period, the pulses 78 have the same number, that is, the 34th, 68th and 102nd pulses are sampled. However at the time 82 when the speed of the motor 34 shifts to an incorrect value, the sampled pulses, beginning with the pulse 79, which is the 102nd pulse, are the 146th and 190th pulses. Of course a speed jump of this magnitude is extremely unlikely, but this circuit makes it possible for the speed to shift a much smaller amount without being controlled by the comparator 57.

FIG. 5 shows one embodiment of the present invention, which overcomes the speed shift problem of the system shown in FIG. 3. The system in FIG. 5 does not have a sampling circuit between the coil 41 and the comparator 57 but instead supplies the relatively high frequency pulses having a fundamental frequency of about 1,020 Hz directly to the comparator 57 by way of the record and edit terminal R/E of the switch 56. The circuit in FIG. 5 also has an additional switch 83 that has a record and edit terminal R/E connected to a high stable fixed frequency oscillator 84 that emits pulses having a fundamental frequency of 1,020 Hz. The switch 83 has a playback terminal P connected to the coil 51.

The operation of the circuit in FIG. 5 will be described with reference to the waveform in FIG. 6. During the initial recording of information on the tape 32, the arms of the switches 56 and 83 will be in contact with the respective R/E terminals. As a result, the comparator 57 will be comparing the relative timing between high frequency pulses from the fixed frequency oscillator 84 and high frequency pulses from the coil 41. The output control signal from the comparator 57 will be such as to maintain the speed of the motor 34 at the exact value needed to make the pulses from the coil 41 equal in frequency and phase to the pulses from the oscillator 84. At the same time, signals from the source 11 are being recorded on the tape 32 by the heads 17a and 17b and the phase of the shaft 22 is being controlled by the phase comparator 48 to maintain relatively low frequency pulses received from the coil 51 in phase with the similarly low frequency pulses received from the circuit 47. The circuit 47 will also supply pulses 62 by way of the switch 58 to the control transducer 59 to be recorded as control pulses 61 along the edge of the tape 32.

During normal playback, the transducer 59 reproduces the pulses 61 and applies them by way of the switch 58 to the comparator 48 where they are compared with the pulses 63 from the coil 51. The arms of the switches 56 and 83 are placed in contact with their respective playback terminals P so that the comparator circuit 57 is comparing the relative timing of the pulses 61 with the pulses 63 in order to control the motor 34. As long as the motor is properly controlled, the tension in the tape 32 will be correct and rotation of the capstan 33 and the shaft 22 will be stable and at the proper relative speeds.

During edit playback, switch 12 has its arm engaged with its terminal E and the switch 58 is open, that is, its arm is placed in contact with the terminal E (PB) which is not connected to any other part of the circuit, and therefore comparator 48 will compare the pulses from the master VTR 66 by way of the vertical sync separator circuit 46 and the divide-by-two circuit 47, with the pulses from the coil 51. The comparator 57 will still be controlled by the comparison of pulses 63 from the coil 51 and the pulses 61 from the transducer 59.

At the end of the edit playback time 68, when the operation is switched over to edit record, the arms of the switches 56 and 83 will be shifted to their R/E terminal. Since the frequency produced by the oscillator 84 and by the coil 41 is relatively high, even if the pulses 76 from the coil 41 are not initially coincident with pulses 86 from the oscillator 84, the timing can at most be off by only approximately 0.001 sec. Thus the output voltage of the phase comparator 57, as indicated by a reference numeral 87, will be relatively small. The speed of motor 34, which was kept at the proper value during playback, may have to increase slightly during the interval 88, but this increase is not so much an increase in speed as it is a shift in the phase of the shaft 38. Thus as the phase of the shaft 38 changes to the point where the pulses 76 becomes more nearly coincident with the pulse 86, the speed of the motor will drop back during the interval 89 to the original speed but with the shaft 38 in the correct relative phase position.

In the embodiment of the invention shown in FIG. 7 most of the system is the same as in the embodiment in FIG. 5. However, in place of the relatively high frequency oscillator 84, the system in FIG. 7 provides pulses at a stable pulse rate higher than the 1,020 Hz frequency of pulses generated in the coil 41 when the motor 34 is running at the proper speed. These higher frequency pulses may be derived from the horizontal synchronizing signal pulses of the signal that passes through the switch 12 during original recording and edit recording operations. The vertical synchronizing signals received from the video source 11 during original recording intervals or from the master VTR 66 during edit recording intervals are separated by the synchronizing signal separator circuit 46 in the manner described previously. Horizontal synchronizing signals are separated at the same time by means of a separator circuit 91, the output of which is connected to a count-down circuit 92 that devides the frequency of the horizontal synchronizing pulses by sixteen. The frequency of the horizontal synchronizing signals is approximately 15.73 KHz, and when this frequency is divided by sixteen, the result is 983.4 Hz. Thus the number of poles in the magnetic member attached to the shaft 38 must be different from the number used in previous embodiments, but the difference is not large. The frequency of 983.4 Hz is till relatively high compared to the number of revolutions per second of the shaft 38.

As a alternative source of a stable frequency of 983.4 Hz, the system may utilize an oscillator 93 of approximately 3.58 MHz, which is the burst frequency for color television signals. The signal from the oscillator 93 is applied to a separate count-down circuit 94 that counts down to the desired frequency of 983.4 Hz. The count-down circuit 94 is shown connected by a dotted line to the R/E terminal of the switch 83 to indicate that either the oscillator 93 and its count-down circuit 94 may be used or the horizontal synchronizing signal separator circuit 91 and its count-down circuit 92 may be used. Since the 3.58 MHz frequency of the oscillator 93 is an odd integral multiple of one half the horizontal synchronizing frequency, the count-down circuit 94 may be arranged to take this into account and, instead of feeding signals directly to the R/E terminal of the switch 83, may, alternatively, feed signals of approximately 15.73 KHz to the count-down circuit 92 to be counted down to the desired 983.4 Hz. This is equivalent to using the count-down circuit 92 as the last part of the count-down circuit 94, as indicated by the dotted line connecting the count-down circuit 94 to the circuit 92.

What is claimed is:

1. A video tape recording and editing apparatus having normal recording, normal playback, editing playback and editing recording modes of operation, comprising rotary magnetic head means for recording and reproducing video signals on a magnetic tape, a head drive motor for effecting rotation of said rotary head means, a first signal generator for generating a first rotational reference signal of relatively low frequency in synchronism with the rotation of said rotary head means, first speed control means for controlling the rotation of said rotary head means, a first source of video signals to be recorded on said tape in said normal recording mode of operation, a second source of video signals to be recorded on said tape in said editing recording mode of operation, separator means for separating control pulses from video signals supplied thereto, first switch means for supplying signals to said separator means from said first source in said normal recording mode of operation and from said second source in both said editing playback and editing recording modes of operation and for isolating said separator means from said first and second sources in said normal playback mode of operation, control transducer means for recording said control pulses from said separator means on said tape in said normal and editing recording modes of operation and for reproducing said control pulses recorded on the tape in said normal and editing playback modes of operation, first comparator means connected with said first speed control means for controlling the rotation of said rotary head means in response to comparison of two input signals applied to said first comparator means, means applying said first rotational reference signal and said control pulses from said separator means as said two input signals for the first comparator means in said normal recording, editing playback and editing recording modes of operation, and applying said first rotational reference signal and the reproduced control pulses from said control transducer means as said two input signals for the first comparator means in said normal playback mode of operation, a rotatable capstan for effecting longitudinal movement of the tape in each of said modes of operation, a capstan drive motor for rotating said capstan, a second signal generator for generating a second rotational reference signal of relatively high frequency in synchronism with the rotation of said capstan, second speed control means for controlling the speed at which said capstan drive motor rotates said capstan, a source of a fixed relatively high frequency signal of the same order as said second rotational reference signal, second comparator means connected to said second speed control means for controlling the speed of rotation of said capstan in response to comparison of two input signals applied to said second comparator means, and second switch means applying said fixed relatively high frequency signal and said second rotational reference signal to said second comparator means, as said two input signals for the latter, in said normal recording and editing recording modes of operation and applying said first rotational reference signal and said control pulses reproduced by said control transducer means, as said two input signals for the second comparator means, in said normal playback and editing playback modes of operation.

2. A video tape recording and editing apparatus according to claim 1; in which said second comparator means has first and second input terminals, and said second switch means includes first and second switches connected to said first and second input terminals, respectively, and being simultaneously movable between first positions in which said first and second switches connect said first and second input terminals to said source of the fixed relatively high frequency signal and to said second signal generator, respectively, and second positions in which said first and second switches connect said first and second input terminals to said first signal generator and said control transducer means, respectively.

3. A video tape recording and editing apparatus according to claim 1; in which said source of the fixed relatively high frequency signal comprises a pulse generator.

4. A video tape recording and editing apparatus according to claim 1; in which said source of the fixed relatively high frequency signal includes horizontal synchronizing signal separator means for separating horizontal synchronizing signals from the video signals received selectively from said first and second sources thereof by way of said first switch means, and count-down means receiving the separated horizontal synchronizing signals and producing an output signal having a repetition rate that is a sub-multiple of the repetition rate of said separated horizontal synchronizing signals.

5. A video tape recording and editing apparatus according to claim 1; in which said source of the fixed high frequency signal includes an oscillator timed to the burst signal frequency of said video signals, and count-down means connected to said oscillator for producing an output signal having a frequency that is an odd sub-multiple of twice said burst signal frequency.

* * * * *